United States Patent [19]

Nijssen et al.

[11] Patent Number: 4,914,858
[45] Date of Patent: Apr. 10, 1990

[54] METHOD AND DEVICE FOR LIGHTING SEEDS OR PLANTS

[75] Inventors: Cornelis T. M. Nijssen, Leiderdorp; Otto A. Kühn; Willem Verbeek, both of Wageningen, all of Netherlands

[73] Assignee: Nijssen Light Division B.V., Netherlands

[21] Appl. No.: 242,337

[22] Filed: Sep. 2, 1988

[30] Foreign Application Priority Data

Sep. 16, 1987 [NL] Netherlands .................. 8702216

[51] Int. Cl.$^4$ .................... A01C 1/00; A01G 9/20
[52] U.S. Cl. ............................ 47/58; 47/60; 47/DIG. 6
[58] Field of Search ............ 47/DIG. 6, 61, 17, 19, 47/60, 58, 14, 1.4

[56] References Cited

U.S. PATENT DOCUMENTS

| | | |
|---|---|---|
| 2,051,461 | 8/1936 | Lee .................................. 47/60 |
| 3,930,335 | 1/1976 | Widmayer . |
| 4,060,933 | 12/1977 | Kadkade . |
| 4,292,762 | 10/1981 | Fogg et al. .................. 47/19 X |
| 4,408,414 | 10/1983 | Lehle et al. ................... 47/1 R |
| 4,650,336 | 3/1987 | Moll ............................ 356/317 |
| 4,804,850 | 2/1989 | Norrish et al. ............... 356/317 |

FOREIGN PATENT DOCUMENTS

| | | |
|---|---|---|
| 2542567 | 3/1984 | France . |
| 316638 | 12/1956 | Switzerland . |
| WO00693 | 3/1984 | World Int. Prop. O. . |

Primary Examiner—Danton D. DeMille
Attorney, Agent, or Firm—Watson, Cole, Grindle & Watson

[57] ABSTRACT

A method for fostering the germination of plant seeds or the cultivation of plant cuttings wherein light-emitting diodes are positioned closely proximate the plant seeds or plant cuttings and energized so as to emit irradiating light on the plant seeds or plant cuttings of a wavelength between 400 and 800 nm. The light-emitting diodes can be energized with continuous or intermittent, high frequency energy.

5 Claims, 1 Drawing Sheet

METHOD AND DEVICE FOR LIGHTING SEEDS OR PLANTS

BACKGROUND OF THE INVENTION

The invention relates to a method for fostering the germination of plant seeds and the cultivation of plant cuttings by artificial lighting thereof from a light source.

Such a method is known from WO-A-84/00693.

Used in the known method as light source are gas discharge tubes. Through the use of special gas fillings a required wave length range is obtained. The use of filters or coatings on the light sources for the purpose of filtering out an undesired part of the spectrum is avoided as a result.

Such gas discharge tubes however require a high energy consumption. The energy consumption lies in the order of magnitude of 36 W. In the case of incandescent lamps an energy consumption of 150 to 450 W can be expected.

The high energy consumption results in the development of a great deal of heat. A comparatively large spacing between the object for lighting and the light source must therefore be selected.

SUMMARY OF THE INVENTION

The invention has for its object to provide a solution for the above-mentioned drawbacks. This is achieved according to the invention through the use of light-emitting diodes (LEDs) as light source.

The invention derives from the insight that while it is true that with the use of a cold light source, as is the case with an LED, a limited lighting strength is achieved, because the light source does not radiate any heat it can be placed very close to the object for lighting. The consumption of an LED is approximately 50 mW. It has been found that with a correctly chosen wave length a lighting nevertheless takes place such that the intended purpose is achieved.

As a result of the invention it is possible to further plant growth in, for example, entirely darkened, closed accommodations.

A light source can be used for lighting with a light spectrum lying between 400 and 800 nm.

It is possible to supply a light source intermittently at high frequency, whereby a lighting strength can be selected that is greater than in the case of continuous operation. As a result of a certain slowness of plants in reacting to light the intermittent lighting is sensed by the plant as more or less continuous and the speed of germination is not adversely affected as a result. Intermittent feed can also be applied for the saving of energy. The supply voltage used can be kept low, namely about 24 volts. This is of particular advantage in the case of use in means of transport. Further features and advantages of the invention will be elucidated with reference to the drawings.

DETAILED DESCRIPTION OF THE PREFERRED EMBODIMENT

Figure 1:
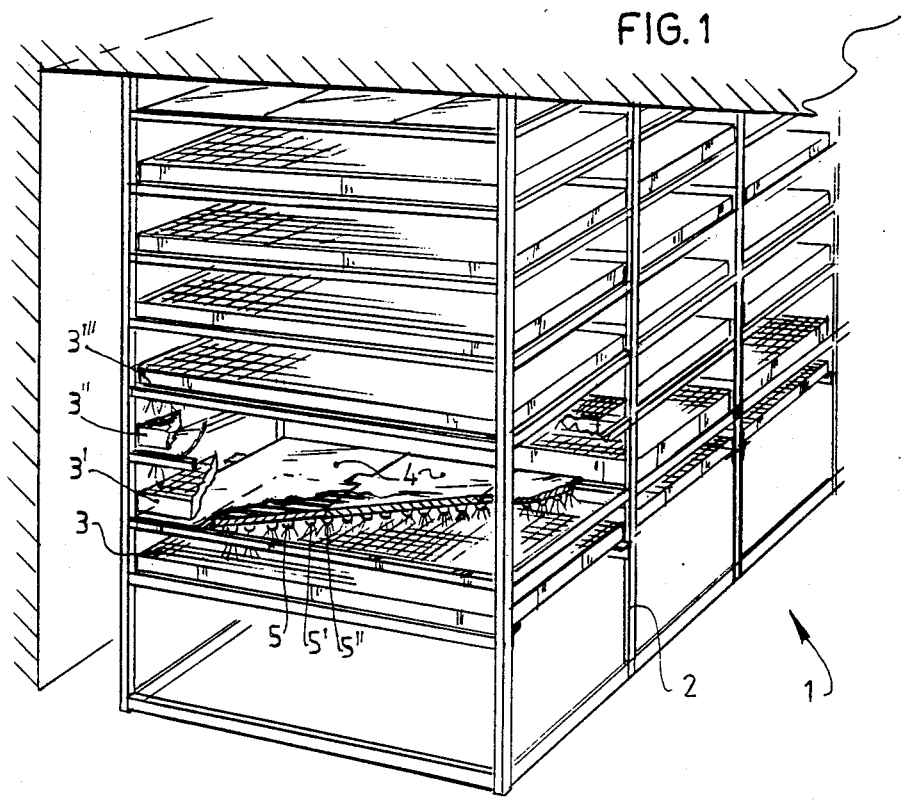
FIG. 1 shows a view of a nursery assembly as employed for the germination of seeds according to the present invention.
Figure 2:
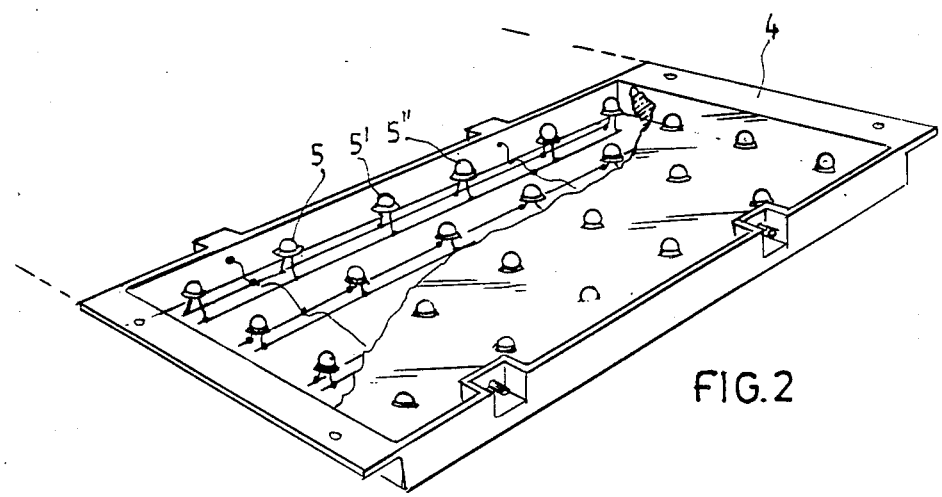
FIG. 2 shows a light source utilized in the nursery assembly.

The nursery assembly 1 shows in FIG. 1 is built up of a rack 2 in which trays 3, 3' are accommodated. Trays 3, 3' are filled with a substrate into which the seeds for germinating are inserted. Situated above each tray 4 is a group of LEDs 5, 5', 5''. The LEDs are operative in the light spectrum of approximately 660 nm. This spectrum is optimal for rapid germination of seeds. The irradiating light in the ray bundles of adjacent LEDs overlap one another.

By means of a frequency control the ignition timing, and therefore the frequency of the lighting, is adjustable.

Because of the low heat production the packing in the nursery area of the nursery assembly can be more dense than in the case of known nursery areas assemblies.

We claim:

1. A method of fostering growth of plant propagative material which comprises the steps of:
   (a) providing a nursery area containing plant propagative material in a substrate,
   (b) positioning a plurality of light-emitting diodes (LEDs) closely proximate to said nursery area so that irradiating light emitted from said LEDs can strike said plant propagative material to foster plant growth, and
   (c) energizing said LEDs so that they emit irradiating light on said plant propagative material having a wavelength of between 400 to 800 nm.

2. A method as defined in claim 1, wherein in step (b) said LEDs are positioned such that irradiating light from adjacent LEDs overlaps at said nursery area.

3. A method as defined in claim 1, wherein in step (c) high frequency energy is intermittently supplied to said LEDs.

4. A method as defined in claim 1, wherein in step (c) a current of 24 volts is supplied to said LEDs.

5. A device for fostering germination of plant seeds and cultivation of plant cuttings, which comprises a nursery assembly having tray for holding a substrate in which the plant propagative material is inserted, a cover spaced from the trays in close proximity thereto having a plurality of light-emitting diodes facing the trays emitting light at wavelengths between 400 and 800 nm for providing light energy to the plants for fostering growth, the nursery assembly being dimensioned to be accommodated in a transport vehicle.

* * * * *